United States Patent [19]

Hurter

[11] Patent Number: 4,843,151
[45] Date of Patent: Jun. 27, 1989

[54] MONOAZO DYES CONTAINING A 4'-METHYL-3'-SULFO-5-ACYLAMINO-2-AZO-1,1'-DIPHENYLSULFONE COMPONENT

[75] Inventor: Rudolf Hurter, Basel, Switzerland

[73] Assignee: Ciba-Geigy Corporation, Ardsley, N.Y.

[21] Appl. No.: 36,423

[22] Filed: Apr. 9, 1987

Related U.S. Application Data

[63] Continuation-in-part of Ser. No. 819,489, Jan. 15, 1986, abandoned, which is a continuation of Ser. No. 696,855, Jan. 30, 1985, abandoned, which is a continuation of Ser. No. 357,932, Mar. 15, 1982, abandoned.

[30] Foreign Application Priority Data

Mar. 27, 1981 [CH] Switzerland ............... 2096/81

[51] Int. Cl.$^4$ .................. C09B 29/01; C09B 29/085; C09B 29/09; C09B 29/36
[52] U.S. Cl. .................. 534/643; 260/507 R; 534/582; 534/775; 534/782; 534/783; 534/845; 534/847; 534/887
[58] Field of Search ............ 534/845, 643, 775, 782, 534/783, 847

[56] References Cited

U.S. PATENT DOCUMENTS

| | | | |
|---|---|---|---|
| 2,077,854 | 4/1937 | Richard | 534/845 |
| 2,080,188 | 5/1937 | Scheideggar | 534/845 |
| 2,361,481 | 10/1944 | Kvalnes | 534/845 |
| 3,692,769 | 9/1972 | Weaver et al. | 534/845 |
| 3,990,846 | 11/1976 | Lehinant et al. | 534/845 |
| 4,033,943 | 7/1977 | Ramanathan | 534/845 |
| 4,602,084 | 7/1986 | Hurter | 534/641 |

FOREIGN PATENT DOCUMENTS

| | | | |
|---|---|---|---|
| 871737 | 5/1942 | France | 534/845 |
| 100855 | 8/1923 | Switzerland | 534/845 |
| 100857 | 8/1923 | Switzerland | 534/845 |
| 902877 | 5/1962 | United Kingdom | 534/845 |
| 1179760 | 1/1970 | United Kingdom | 534/845 |
| 1309264 | 3/1973 | United Kingdom | 534/845 |
| 1309294 | 3/1973 | United Kingdom | 534/845 |
| 1540914 | 2/1979 | United Kingdom | 534/845 |

OTHER PUBLICATIONS

Geigy III, Chemical Abstracts, vol. 43, #2440e-g (1949).

Primary Examiner—Floyd D. Higel
Attorney, Agent, or Firm—Wenderoth, Lind & Ponack

[57] ABSTRACT

The monoazo dyes of the formula

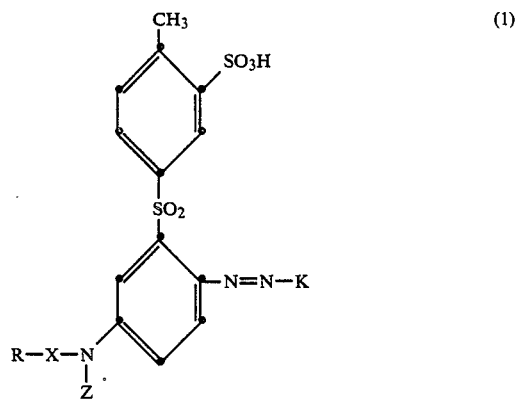

(1)

in which K is the radical of a coupling component of the aminobenzene, alkoxybenzene, hydroxybenzene, pyrazolone, aminopyrazole, pyrimmidine, indole, diphenylamine or acetoacetamide series, R is a substituted or unsubstituted $C_{1-12}$ alkyl, cycloalkyl, aralkyl or aryl radical, X is a —CO— or —SO$_2$— group, a —COO— group, R being attached to the oxygen atoms, or an —SO$_2$NH— or

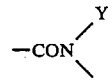

group, R being attached to the nitrogen atom and Y being hydrogen or $C_{1-4}$ alkyl, and Z is hydrogen or $C_{1-4}$ alkyl, produce dyeings having good fastness to light and wet processing on polyamide material.

10 Claims, No Drawings

MONOAZO DYES CONTAINING A 4'-METHYL-3'-SULFO-5-ACYLAMINO-2-AZO-1,1'-DIPHENYLSULFONE COMPONENT

The object on which the present invention is based was to find novel dyes which are suitable for dyeing natural and synthetic polyamides from an aqueous bath and which also have shades ranging from yellow to red and which, in addition, have improved fastness properties, particularly in regard to fastness to light.

It has now been found that the monoazo dyes of the formula (1) satisfy the said requirements.

The present invention therefore relates to monoazo dyes of the formula

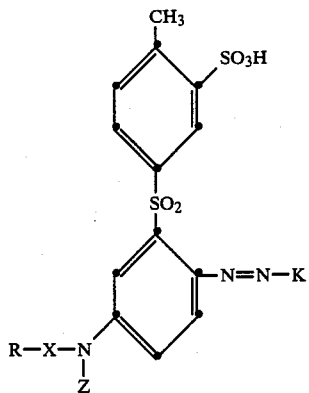

(1)

in which K is the radical of a coupling component of the aminobenzene, alkoxybenzene, hydroxybenzene, pyrazolone, aminopyrazole, pyrimidine, indole, diphenylamine or acetoacetamide series, R is a substituted or unsubstituted $C_{1-12}$ alkyl, cycloalkyl, aralkyl or aryl radical, X is a —CO— or —SO$_2$— group, a

group, R being attached to the oxygen atom, or an —SO$_2$NH— or

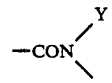

group, R being attached to the nitrogen atom and Y being hydrogen or $C_{1-4}$ alkyl, and Z is hydrogen or $C_{1-4}$ alkyl.

The radical K can contain the substitutents customary in azo dyes, for example alkyl groups having 1 to 4 carbon atoms, such as methyl, ethyl, propyl, isopropyl, butyl, isobutyl, sec.-butyl and tert.-butyl, alkoxy groups having 1 to 4 carbon atoms, such as methoxy, ethoxy, propoxy, isopropoxy, butoxy, isobutoxy, sec.-butoxy and tert.-butoxy, phenoxy groups, alkanoylamino groups having 1 to 6 carbon atoms, such as acetylamino or propionylamino, benzoylamino groups, amino groups, such as —NH$_2$, methylamino, ethylamino, dimethylamino, diethylamino, cyanoethylamino, hydroxyethylamino, dihydroxyethylamino, cyclohexylamino, benzylamino and phenylamino, carboxylic acid ester groups, such as methoxycarbonyl and ethoxycarbonyl, trifluoromethyl, nitro, cyano, acetyl, methylsulfonyl, carbamoyl, sulfamoyl, ureido, hydroxyl, carboxyl, sulfo or sulfomethyl groups and halogen, such as fluorine, chlorine and bromine.

A $C_{1-12}$ alkyl radical R is a straight-chain or branched alkyl radical which can be substituted further, for example by halogen, such as fluorine, chlorine or bromine, hydroxyl, sulfato, sulfo, carboxyl, cyano, $C_{1-4}$ alkoxy, such as methoxy, ethoxy, propoxy, isopropoxy, butoxy, sec.-butoxy, tert.-butoxy or isobutoxy, and alkanoyl groups having 1 to 6 carbon atoms, such as the acetyl or propionyl group, and the benzoyl group. The following are examples of R as a $C_{1-12}$ alkyl radical: methyl, ethyl, β-chloroethyl, β-hydroxyethyl, β-cyanoethyl, propyl, isopropyl, 2-oxopropyl, n-butyl, isobutyl, sec.-butyl, tert.-butyl, pent-3-yl, hept-3-yl and dodecyl. R is preferably a substituted or unsubstituted $C_{1-7}$ alkyl radical.

If R is a cycloalkyl radical, examples of suitable cycloalkyl groups are preferably those having 5-membered or 6-membered rings, particularly the cyclohexyl group.

An aralkyl radical R is preferably a $C_{1-4}$ alkylphenyl or alkylnaphthyl radical, for example the benzyl or phenethyl radical.

If R is an aryl radical, the latter preferably belongs to the benzene or naphthalene series and can be substituted further, for example by $C_{1-4}$ alkyl groups, such as methyl, $C_{1-4}$ alkoxy groups, such as methoxy and ethoxy, halogen, such as fluorine, chlorine or bromine, alkanoylamino groups having 1 to 6 carbon atoms, such as acetylamino, hydroxyl and carboxyl. As an aryl radical, R is, in particular, a substituted or unsubstituted phenyl radical.

If X is a

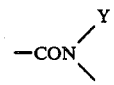

group, Y is hydrogen or $C_{1-4}$ alkyl, such as methyl, ethyl, propyl, isopropyl, butyl, isobutyl, sec.-butyl or tert.-butyl; Y is preferably hydrogen, methyl or ethyl.

If Z is a $C_{1-4}$ alkyl radical, an example of a suitable radical is a methyl, ethyl, propyl, isopropyl or butyl radical. Z is preferably hydrogen.

Preferred monoazo dyes of the formula (1) are those in which K is an aminobenzene, N—$C_{1-4}$ alkylaminobenzene or N,N-di-$C_{1-4}$ alkylaminobenzene radical which can be substituted in the benzene ring by methyl, methoxy, chlorine, acetylamino, ureido, benzoylamino, chlorobenzoylamino and methylphenylsulfonylamino, and in which the N-alkyl radicals independently of one another can be substituted by hydroxyl, chlorine, cyano, sulfo or phenyl, or K is a $C_{1-2}$ alkoxybenzene radical which can be substituted by methyl, an N-methyl-N,N-diphenylamino radical, a 2-methylindole, 2-phenylindole, N-octyl-2-methylindole or N-methyl-2-phenylindole radical, a 1-phenyl-3-methylpyrazolone radical which can be substituted in the phenyl radical by chlorine and methyl, or a 1-phenyl-3-methylaminopyrazole radical which can be substituted in the phenyl radical by chlorine or sulfo, or is a 2,4,6-triaminopyrimidine radical and in which R is $C_{1-7}$ alkyl which can be substituted by chlorine, hydroxyl, methoxy or acetyl, or is cyclohexyl, benzyl or phenyl which can be substituted by methyl, hydroxyl, chlorine, carboxyl or acetylamino, X is a —CO— or —SO$_2$— group, a

group, R being attached to the oxygen atom, or an —SO$_2$NH— or

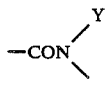

group, R being attached to the nitrogen atom and Y being hydrogen, methyl or ethyl, and Z is hydrogen.

Monoazo dyes of the formula (1) which are particularly preferred are those in which K is a 4-N,N-diethylamino-2-methyl-1-phenyl radical or a 2-methyl-3-indole radical, R is ethyl, β-chloroethyl, tert.-butyl, phenyl or 4-methylphenyl and X is the —CO— or —SO$_2$— group and Z is hydrogen.

The monoazo dyes of the formulae

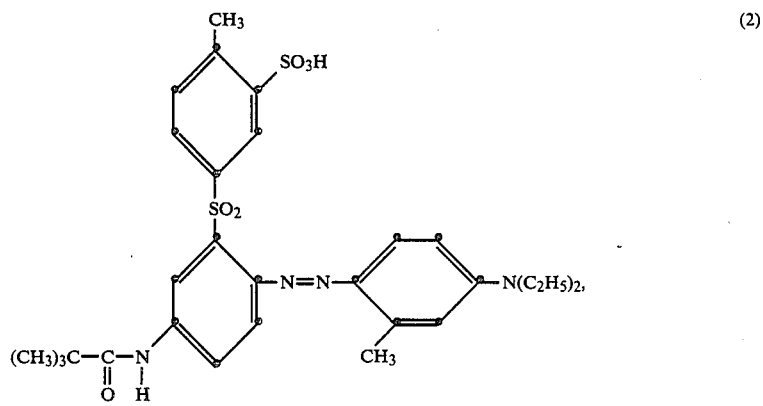

(2)

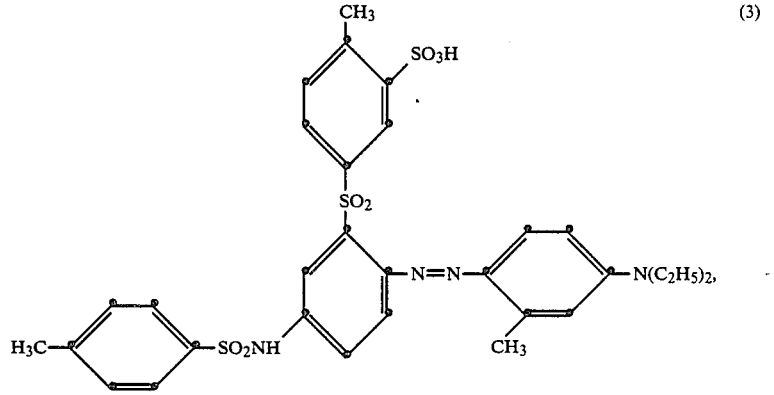

(3)

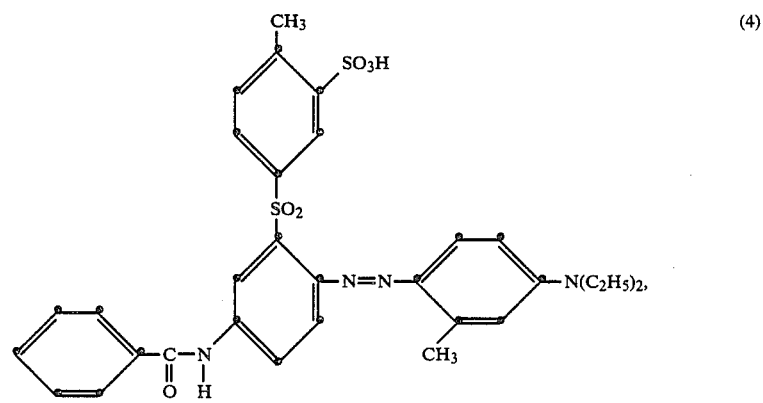

(4)

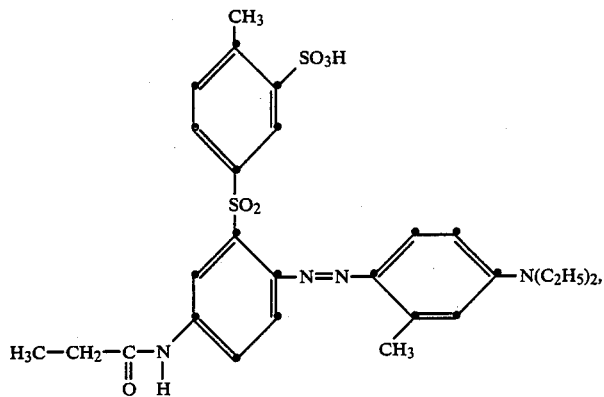
(5)
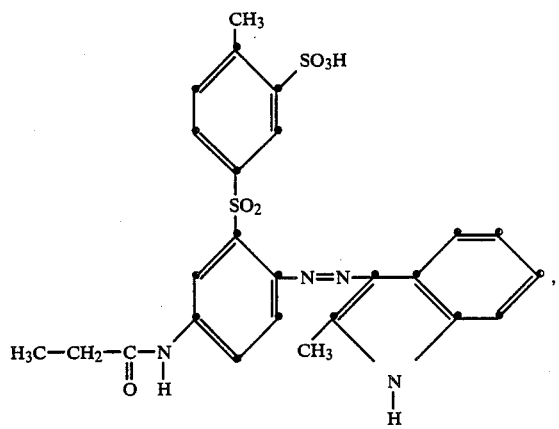
(6)
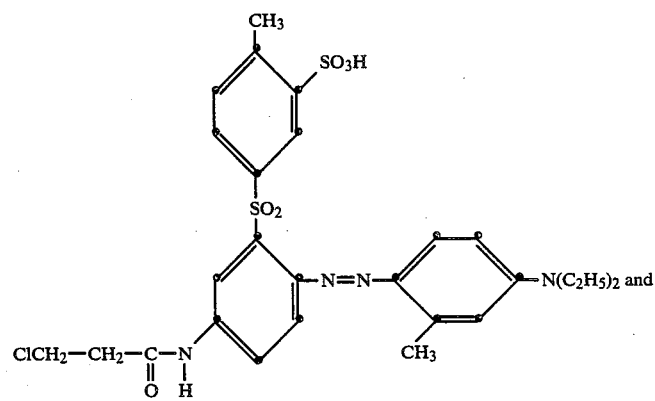
(7)
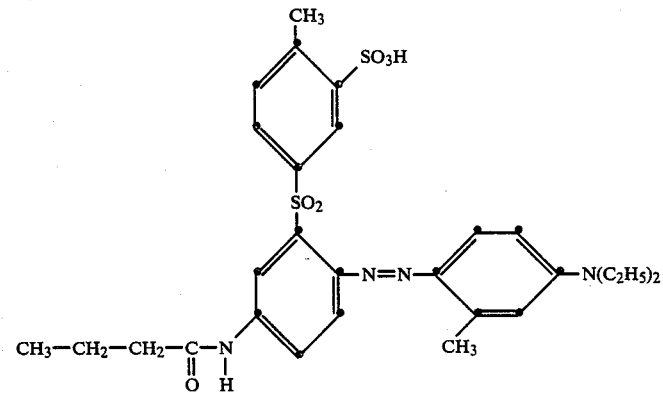
(8)
are valuable representatives of this class.

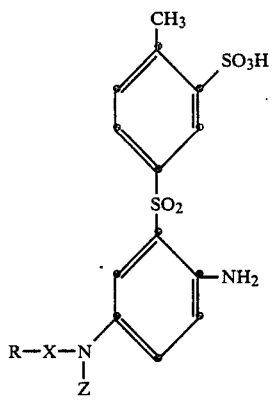

(9)

and coupling the product with a coupling component of the formula

H—K  (10)

K, R, X and Z in the formulae (9) and (10) being as defined under formula (1).

As a rule, the diazotisation of the diazo components of the formula (9) is effected by the action of nitrous acid in an aqueous mineral acid solution at a low temperature, while the coupling with the coupling component of the formula (10) is effected at acid or neutral to alkaline pH values.

In the monoazo compound of the formula (1) thus obtained, the group R—X can, if desired, be varied by transacylation, by hydrolysing the monoazo compound of the formula (1) and subsequently reacting the product with a compound which introduces another group R—X.

If desired, a free amino group in the radical K can, after coupling, be converted into an acylamino or alkylamino group by means of an acylating or alkylating agent, and similarly a hydroxyl group in the radical K can be converted into an alkoxy group by alkylation.

The coupling component of the formula (10) which is used is preferably aminobenzene or an alkylaminobenzene, phenol, pyrazolone, aminopyrazole, pyrimidine, indole, diphenylamino or acetoacetamide, it being possible for the said coupling components to be substituted further, and, if desired, the phenolic hydroxyl group can be converted, after the coupling, into an alkoxy group by alkylation.

A further preferred embodiment comprises diazotising a diazo component of the formula (9) wherein R is $C_{1-7}$ alkyl which can be substituted by chlorine, hydroxyl, methoxy or acetyl, or is cyclohexyl, benzyl or phenyl which can be substituted by methyl, hydroxyl, chlorine, carboxyl or acetylamino, X is a —CO— or —SO$_2$— group, a

group, R being attached to the oxygen atom, or an —SO$_2$NH— or

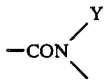

group, R being attached to the nitrogen atom and Y being hydrogen, methyl or ethyl, and Z is hydrogen, and coupling the product with a coupling component of the formula (10) in which K is an aminobenzene, N—C$_{1-4}$ alkylaminobenzene or N,N-di-C$_{1-4}$ alkylaminobenzene radical which can be substituted in the benzene ring by methyl, methoxy, chlorine, acetylamino, ureido, benzoylamino, chlorobenzoylamino or methylphenylsulfonylamino, and in which the N-alkyl radicals independently of one another can be substituted by hydroxyl, chlorine, cyano, sulfo or phenyl, or is a phenol radical which can be substituted by methyl, the phenolic hydroxyl group being converted, after coupling, into a $C_{1-2}$ alkoxy group, an N-methyl-N,N-diphenylamine radical, a 2-methylindole, N-octyl-2-methylindole or N-methyl-2-phenylindole radical, a 1-phenyl-3-methylpyrazolone radical which can be substituted in the phenyl radical by chlorine or methyl, or a 1-phenyl-3-methylaminopyrazole radical which can be substituted in the phenyl radical by chlorine and sulfo, or is a 2,4,6-triaminopyrimidine radical.

The monoazo dyes of the formula (1) which are particularly preferred are prepared by diazotising a diazo component of the formula (9) in which R is ethyl, β-chloroethyl, tert.-butyl, phenyl or 4-methylphenyl, X is the —CO— or —SO$_2$— group and Z is hydrogen, and coupling the product in the 4-position with 3-methyl-N,N-diethylaniline or in the 3-position with 2-methylindole.

The particularly valuable monoazo dyes of the formulae (2) to (8) are prepared by diazotising 2-amino-5-pivaloylamino-4'-methyl-1,1'-diphenylsulfone-3'-sulfonic acid for the dyes of the formula (2), 2-amino-5-p-tolylsulfonylamino-4'-methyl-1,1'-diphenylsulfone-3'-sulfonic acid for the dye of the formula (3), 2-amino-5-benzoylamino-4'-methyl-1,1'-diphenylsulfone-3'-sulfonic acid for the dye of the formula (4), 2-amino-5-propionylamino-4'-methyl-1,1'-diphenyl-sulfone-3'-sulfonic acid for the dye of the formula (5), 2-amino-5-(3'-chloropropionylamino)-4''-methyl-1,1''-diphenylsulfone-3''-sulfonic acid for the dye of the formula (7) or 2-amino-5-butyrylamino-4'-methyl-1,1'-diphenylsulfone-3'-sulfonic acid for the dye of the formula (8) and coupling the product in the 4-position with 3-methyl-N,N-diethylaniline, or, for the dye of the formula (6), diazotising 2-amino-5-propionylamino-4'-methyl-1,1'-diphenylsulfone-3'-sulfonic acid and coupling the product in the 3-position with 2-methylindole.

The coupling components of the formula (10) are known and are prepared by known methods. From the large number of possible coupling components, the following are mentioned as examples: aniline, dimethylaniline, diethylaniline, 3-methyldimethylaniline, 3-methyldiethylaniline, 3-acetylaminodimethylaniline, 3-methoxycarbonylaminodimethylaniline, 3-ureidodimethylaniline, 3-methyl-6-methoxydiethylaniline, 2,5-dimethoxydiethylaniline, N-ethyl-N-benzylaniline, N-ethyl-N-(β-cyanoethyl)-aniline, N-ethyl-N-(β-hydroxyethyl)-aniline, N-ethyl-N-(β-acetoxyethyl)-aniline, N,N-dibutylaniline, 3-acetylamino-N,N-diethylaniline, N-methyl-N-(β-cyanoethyl)-aniline, 3-methyl- N,N-di-(β-cyanoethyl)-aniline, 3-chloro-N,N-dimethylaniline, 3-methyl-N-ethyl-N-benzylaniline, N,N-di-n-propylaniline, 3-acetylamino-N,N-di-(β-hydroxyethyl)-aniline, 3-methyl-N,N-di-(β-acetoxyethyl)-aniline, N-ethyl-N-(β-chloroethyl)-aniline, 2-methoxy-5-acetylamino-N-benzylaniline, 2-methoxy-5-acetylamino-N-(β-acetoxyethyl)-N-benzylaniline, 3-methyl-N-ethyl-N-(β-cyanoethyl)-aniline, 2-methyl-5-acetylamino-N,N-dimethylaniline, 2-chloro-5-acetylamino-N,N-dimethylaniline, 2-chloro-5-acetylamino-N-(γ-phenoxy-β-hydroxy-n-propyl)-aniline, 3-ureidoaniline, N-ethyl-N-(3'-sulfobenzyl)-aniline, 3-methyl-N-ethyl-N-(βsulfoethyl)-aniline, 3-benzoylamino-N,N-diethylaniline, 3-(p-tolysulfamoyl)-N,N-diethylaniline, 3-(p-chlorobenzoylamino)-N,N-diethylaniline, 3-methoxy-N,N-diethylaniline, 3-methyl-N,N-di-(β-hydroxyethyl)-aniline, 3-methyl-6-methoxy-N,N-di-(β-hydroxyethyl)-aniline, 3-acetylaminoaniline, N,N-di-(β-cyanoethyl)-aniline, 3-acetylamino-N,N-di-(β-cyanoethyl)-aniline, 3-methyl-N-ethyl-N-(β-hydroxyethyl)-aniline, 3-methyl-N-ethyl-N-(β-cyanoethyl)-aniline, N-(β-cyanoethyl)-aniline, N-methyl-N-benzylaniline, phenol, 3-methylphenol, methoxybenzene, 3-ethoxytoluene, 1-hydroxy-4-methoxybenzene, 1-hydroxy-4-tert.-butylbenzene, 1-(3'-chlorophenyl)-3-methypyrazol-5-one, 1-(2'-chloro-6'-methylphenyl)-3-methyl-pyrazol-5-one, 1-phenyl-3-methylpyrazol-5-one, 1-(2'-, 3'- or 4'-sulfophenyl)-3-methylpyrazol-5-one, 1-(2'-chloro-4'-sulfophenyl)-3-methylpyrazol-5-one, 1(2'-chloro-5'-sulfophenyl)-3-methylpyrazol-5-one, 1-(2'-methyl-4'-sulfophenyl)-3-methylpyrazol-5-one, 1-[4',8'-disulfo-2-naphthyl]-3-methylpyrazol-5-one, 1-[5',7'-disulfo-2-naphthyl]-3-methylpyrazol-5-one, 1-(2'-chloro-5'-sulfophenyl)-3-methyl-5-aminopyrazole, 1-(2'-chloro-4'-sulfophenyl)-3-methyl-5-aminopyrazole, 1-(3'-sulfophenyl)-3-methyl-5-aminopyrazole, 1-(4'-sulfophenyl)3-methyl-5-aminopyrazole, 2-methylindole, 2-phenylindone, 1-methyl-2-phenylindole, 1-octyl-2-methylindole, 2,4,6-triaminopyrimidine, N-methyl-N,N-diphenylamine and acetoacetanilide.

The compounds of the formula (9) in which X is the —CO— group and R is a fibre-reactive alkyl radical, for example the 1,2-dibromoethyl or chloromethyl radical, are known, for example from German Offenlegungsschrift No. 2,507,863, and are prepared by known methods. Compounds of the formula

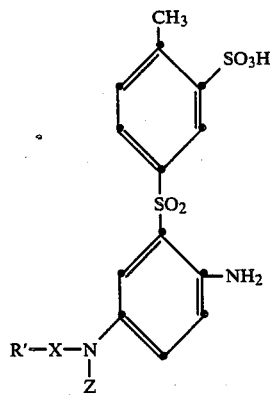

(11)

in which R' is a substituted or unsubstituted C$_{1-12}$ alkyl, cycloalkyl, aralkyl or aryl radical, X is a —CO— or —SO$_2$— group, a

group, R' being attached to the oxygen atom, or an —SO$_2$NH— or

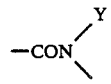

group, R' being attached to the nitrogen atom and Y being hydrogen or C$_{1-4}$ alkyl, and Z is hydrogen or C$_{1-4}$ alkyl, subject to the proviso that, if X is the —CO— group, R' as C$_{1-12}$ alkyl must not be substituted by halogen, are novel and constitute a further subject of the invention.

They are prepared by reacting a compound of the formula

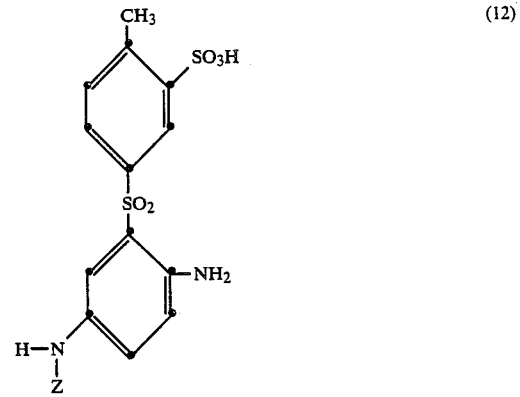

(12)

in aqueous solution, at slightly acid or neutral to slightly alkaline pH values and at temperature between 0° and 100° C. or, if desired, in organic solvents in the presence of dehydrating agents at temperatures between 100° and 150° C., with a compound which introduces the group R'—X, to give a compound of the formula (11).

An example of a suitable compound which introduces the group R'—X is a compound containing a detachable halogen atom, such as a fluorine, chlorine or bromine atom, or a hydroxyl group, attached to X in the group R'—X; a compound which introduces the group R'—X by cleavage of an anhydride; or a compound which is reacted with a compound of the formula (12) by addition and, if desired, subsequent rearrangement, for example addition by means of diketene or an isocyanate, to give a compound of the formula (11).

Examples of suitable dehydrating agents are carbodiimide and triphenyl sulfite.

The following are examples of starting compounds which introduce the group R'—X: acetic anhydride, propionic anhydride, phthalic anhydride, phenyl isocyanate, 3-chlorophenyl isocyanate, methyl isocyanate, ethyl isocyanate, isopropyl isocyanate, tert.-butyl isocyanate, cyclohexyl isocyanate, 4-methylphenyl isocyanate, methyl, ethyl, propyl isopropyl, n-butyl, isobutyl, sec.-butyl, tert.-butyl, β-hydroxyethyl, β-methoxyethyl, phenyl or benzyl chloroformate, chloroformic acid N-methylamide, chloroformic acid N-ethylamide, chloroformic acid N-isopropylamide, chloroformic acid N-tert.-butylamide, chloroformic acid N-cyclohexylamide, chloroformic acid N,N-dimethylamide, chloroformic acid N,N-diethylamide, methanesulfochloride, ethanesulfochloride, ethylaminosulfochloride, phenylaminosulfochloride, p-tolylaminosulfochloride, 4-acetylaminophenylsulfochloride, acetyl chloride, propionyl chloride, acetoacetyl chloride, butyryl, isobutyryl, valeryl, isovaleryl or pivaloyl chloride, 2-ethylbutyryl chloride, 2-ethylhexanecarboxylic acid chloride, 4-methylbenzoyl chloride, 4-chlorobenzoyl chloride, 2-phenylacetyl chloride, diketene, 2-hydroxybenzoic acid and phthalic acid.

The preferred processes for the preparation of the compounds of the formula (11) comprise (a) reacting a compound of the formula (12) with a compound of the formula

R'—X—A     (13)

in which A is halogen, such as flourine, chlorine or bromine, and R' and X are as defined under formula (11);

(b) reacting a compound of the formula (12) with an anhydride which introduces the radical of the formula

R'—CO—     (15)

in order to prepare compounds of the formula

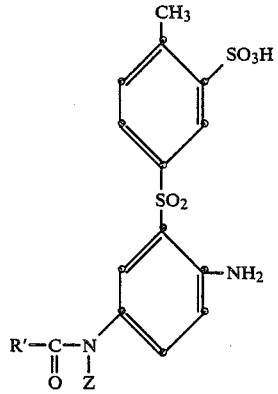
(14)

in which R' and Z are as defined under formula (11); or (c) reacting a compound of the formula (12) with an isocyanate of the formula

R'—N=C=O     (17)

in order to prepare compounds of the formula

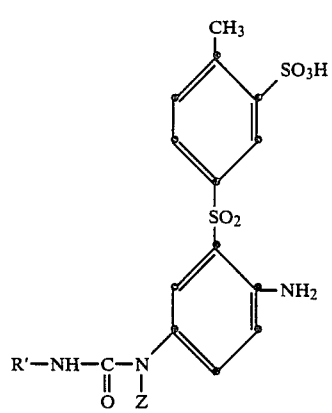
(16)

where R' and Z are as defined under formula (11); or (d) reacting a compound of the formula (12) with diketene; or (e) reacting, in organic solvents and in the presence of dehydrating agents, a compound of the formula (12) with a compound of the formula

R'—COOH     (18),

R', in formula (18), being as defined under formula (11).

Preferred compounds of the formula (11) are those in which R' is $C_{1-7}$ alkyl which can be substituted by hydroxyl, methoxy or acetyl, or is cyclohexyl, benzyl or phenyl which can be substituted by methyl, hydroxyl, chlorine, carboxy or acetylamino, X is a —CO— or —$SO_2$— group, a —COO— group, R' being attached to the oxygen atom, or a —CONH—,

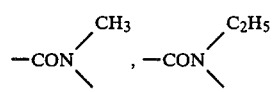

or —$SO_2$NH group, R' being attached to the nitrogen atom, and Z is hydrogen. These compounds are prepared by reacting the compound of the formula (12) in which Z is hydrogen with compounds of the formulae (13) or (17), a diketene or an anhydride which introduces the radical of the formula (15), R' and X in the formulae (13), (15) and (17) being as preferably defined above.

Examples of compounds of the formula (9) or (11) are: 2-amino-5-acetylamino-4'-methyl-1,1'-diphenylsulfone-3'-sulfonic acid, 2-amino-5-propionylamino-4'-methyl-1,1'-diphenylsulfone-3'-sulfonic acid, 2-amino-5-methylsulfamoyl-4'-methyl-1,1'-diphenylsulfone-3'-sulfonic acid, 2-amino-5-(2'-oxybutyrylamino)-4''-methyl-1,1''-diphenylsulfone-3''-sulfonic acid, 2-amino-5(1'-chloropropionylamino)-4''-methyl-1,1''-diphenylsulfone-3''-sulfonic acid, 2-amino-5-butyrylamino-4'-methyl-1,1'-diphenylsulfone-3'-sulfonic acid, 2-amino-5-isopropionylamino-4'-methyl-1,1'-diphenylsulfone-3'-sulfonic acid, 2-amino-5-valerylamino-4'-methyl-1,1'-diphenylsulfone-3'-sulfonic acid, 2-amino-5-isovalerylamino-4'-methyl-1,1'-diphenylsulfone-3'-sulfonic acid, 2-amino-5-pivaloylamino-4'-methyl-1,1'-diphenylsulfone-3'-sulfonic acid, 2-amino-5-(3'-ethylbutyrylamino)-4''-methyl-1,1''-diphenylsulfone-3''-sulfonic acid, 2-amino-5-(5'-ethylhexanoylamino)-4''-methyl-1,1''-diphenylsulfone-3''-sulfonic acid, 2-amino-5- methylaminocarbonylamino-4'-methyl-1,1'-diphenyl-sulfone-3'-sulfonic acid, 2-amino-5-ethylaminocarbonylamino-4'-methyl-1,1'-diphenylsulfone-3'-sulfonic acid, 2-amino-5-isopropylaminocarbonylamino-4'-methyl-1,1'-dimethylsulfone-3'-sulfonic acid, 2-amino-5-tert.-butylaminocarbonylamino-4'-methyl-1,1'-diphenylsulfone-3'-sulfonic acid, 2-amino-5-cyclohexylaminocarbonylamino-4'-methyl-1,1'-diphenylsulfone-3'-sulfonic acid, 2-amino-5-N,N-dimethylaminocarbonylamino-4'-methyl-1,1'-diphenylsulfone-3'-sulfonic acid, 2-amino-5-N,N-diethylaminocarbonylamino-4'-methyl-1,1'-diphenylsulfone-3'-sulfonic acid, 2-amino-5-methoxycarbonylamino-4'-methyl-1,1'-diphenylsulfone-3'-sulfonic acid, 2-amino-5-ethoxycarbonylamino-4'-methyl-1,1'-diphenylsulfone-3'-sulfonic acid, 2-amino-5-($\beta$-hydroxyethoxycarbonylamino)-4'-methyl-1,1'-diphenylsulfone-3'-sulfonic acid, 2-amino-5-propoxycarbonylamino-4'-methyl-1,1'-diphenylsulfone-3'-sulfonic acid, 2-amino-5-isopropoxycarbonylamino-4'-methyl-1,1'-diphenylsulfone-3'-sulfonic acid, 2-amino-5-(n-butoxy-, isobutoxy-, sec.-butoxy-or tert.-butoxy-carbonylamino)-4'-methyl-1,1'-diphenylsulfone-3'-sulfonic acid, 2-amino-5-methoxyethoxycarbonylamino-4'-methyl-1,1'-diphenylsulfone-3'-sulfonic acid, 2-amino-5-ethylaminosulfonylamino-4'-methyl-1,1'-diphenylsulfone-3'-sulfonic acid, 2-amino-5-ethylaminosulfonylamino-4'-methyl-1,1'-diphenylsulfone-3'-sulfonic acid, 2-amino-5-(4'-acetylaminophenylsulfamoyl)-4''-methyl-1,1''-diphenyl-3''-sulfonic acid, 2-amino-5-(4'-methylphenylsulfamoyl)-4''-methyl-1,1''-diphenylsulfone-3''-sulfonic acid, 2-amino-5-phenylsulfamoyl-4'-methyl-4''-methyl-1,1''-diphenylsulfone-3''-sulfonic acid, 2-amino-5-benzyloxycarbonylamino-4'-methyl-1,1'-diphenylsulfone-3'-sulfonic acid, 2-amino-5-phenoxycarbonylamino-4'-methyl-1,1'-diphenylsulfone-3'-sulfonic acid, 2-amino-5-phenylaminocarbonylamino-4'-methyl-1,1'-diphenylsulfone-3'-sulfonic acid, 2-amino-5-(4'-methylphenylaminocarbonylamino)-4''-methyl-1,1''-diphenylsulfone-3''-sulfonic acid, 2-amino-5-(3'-chlorophenylaminocarbonylamino)-4''-methyl-1,1''-diphenylsulfone-3''-sulfonic acid, 2-amino-5-benzylcarbonylamino-4'-methyl-1,1'-diphenylsulfone-3'-sulfonic acid, 2-amino-5-benzoylamino-4'-methyl-1,1'-diphenylsulfone-3'-sulfonic acid and 2-amino-5-(4'-methyl-, 4'-chloro-, 2'-hydroxy- or 2'-carboxy-benzoylamino)-4''-methyl-1,1''-diphenylsulfone-3''-sulfonic acid.

The dyes of the formula (1) are suitable for dyeing and printing materials containing amide groups, such as textile fibres, textile filaments and textile fabrics composed of wool, silk and polyurethane fibres, but particularly for dyeing and printing synthetic polyamide, the customary dyeing processes being used.

These dyes are distinguished by brilliance and tinctorial strength, good exhaustion and build-up capacity, stability towards formaldehyde and overall good fastness, such as fastness to light, fastness to rubbing, fastness to acids and alkalis and fastness to wet processing, in particular fastness to washing, water, hot water and perspiration, and they produce level dyeings.

Dyestuffs according to the invention are distinguished by their good viscosity characteristics in aqueous solution; the dyestuffs according to the invention are distinguished by their shorter time of outflow from the Ostwald viscosimeter in aqueous solution with respect to the dyestuff of Swiss Pat. No. 100,855. This result corresponds to the good solubility in water of the dyestuffs of the invention, whereas the dyestuff of Swiss Pat. No. 100.855 is only gelatinously soluble in water. Dyestuffs according to the invention are distinguished further with respect to the known dyestuff of Swiss Pat. No. 100.855 by their better fastness to light and compensation of streakiness on synthetic polyamide fiber material.

In the following examples, parts are parts by weight. The temperatures are degrees centigrade. The relationship between parts by weight and parts by volume is the same as that between grams and cubic centimetres.

EXAMPLE 1

34.2 g of 2,5-diamino-4'-methyl-1,1'-diphenylsulfone-3'-sulfonic acid are dissolved in 150 ml of water at room temperature and at pH 7, by adding 10 N sodium hydroxide solution. 9.24 g of sodium bicarbonate are sprinkled in and, after cooling, 13.0 g of propionic anhydride are added dropwise at 5°–7° in the course of one hour. Precipitation is completed by adding sodium chloride and the product is filtered off, washed with brine and dried at 60°–70° in a vacuum cabinet. This gives 39.6 g of the intermediate of the formula

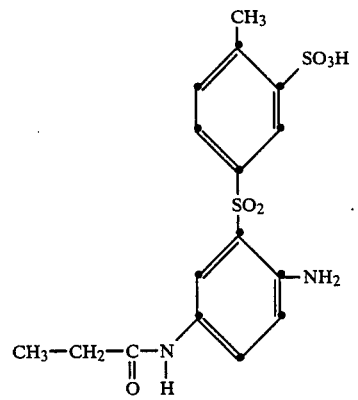

EXAMPLE 2

34.2 g of 2,5-diamino-4'-methyl-1,1'-diphenylsulfone-3'-sulfonic acid are dissolved in 150 ml of water at room temperature and at pH 7, by adding 2 N sodium hydroxide solution. The solution is cooled and 15.4 g of 3-chlorophenyl isocyanate are added dropwise at 3°–5° in the course of 1 hour. The pH is then adjusted to 8 with a few drops of 2 N sodium hydroxide solution, and the solution is warmed to 85° and clarified by filtration with active charcoal. The product which has crystallised out is filtered off at room temperature after a little time and, after being washed with brine, is dried at 60°–70° in vacuo. This gives 50.96 g of the intermediate of the formula

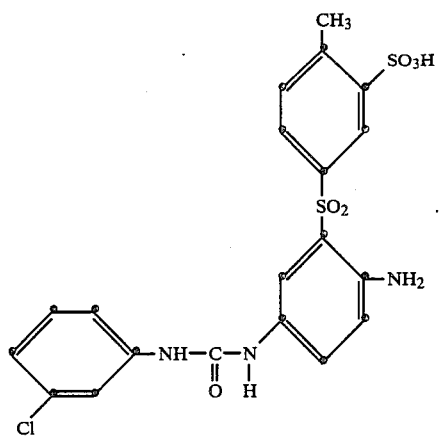

EXAMPLE 3

34.2 g of 2,5-diamino-4'-methyl-1,1'-diphenylsulfone-3'-sulfonic acid are dissolved in 150 ml of water at room temperature and at pH 7, by adding 2 N sodium hydroxide solution. 9.24 g of sodium bicarbonate are sprinkled in and, after cooling, 13.65 g of isobutylchloroformate are added dropwise at 2°–5° in the course of one hour. After stirring has been continued for a short time, the pH is adjusted to 5 with hydrochloric acid and the solution is clarified by filtration with active charcoal and evaporated to dryness in vacuo. This gives 47.84 g of the intermediate of the formula

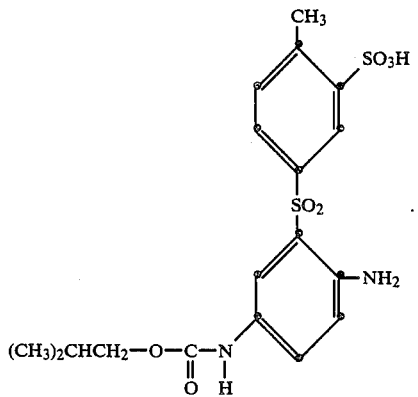

EXAMPLE 4

34.2 g of 2,5-diamino-4'-methyl-1,1'-diphenylsulfone-3'-sulfonic acid are dissolved in 150 ml of water at room temperature and at pH 7 by adding 2 N sodium hydroxide solution. After 11.76 g of sodium bicarbonate have been added, 13.74 g of methanesulfochloride are added dropwise in the course of approx. 2 hours. The neutral mixture is saturated with sodium chloride and the product which has been salted out is filtered off. After washing with brine and drying at 60°–75° in vacuo, 42.42 g of the intermediate of the formula

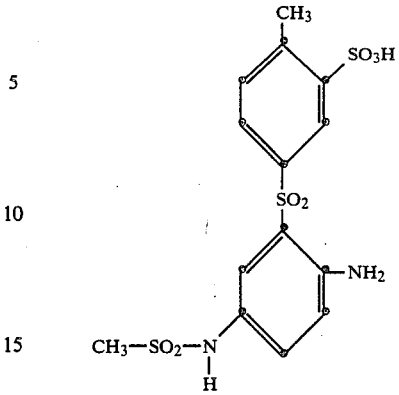

are obtained.

EXAMPLE 5

Acetoacetylation 34.2 g of 2,5-diamino-4'-methyl-1,1'-diphenylsulfone-3'-sulfonic acid are dissolved in 150 ml of water at room temperature and at pH 7 by adding 10 N sodium hydroxide solution. After cooling to 5°, 9.24 g of diketene are added dropwise at 2°–5° in the course of 1½ hours. The cloudy solution is clarified by filtration with active charcoal and is then evaporated to dryness in vacuo. 45.2 g of a slightly hygroscopic powder are obtained.

Diazotisation 8.52 g of the acetoacetyl component are dissolved in 30 ml of water at room temperature and the pH is adjusted to 7–8. 5 ml of 4 N sodium nitrite are added and the solution is added dropwise to a mixture of 40 g of ice and 5 ml of 10 N hydrochloric acid. After 10 minutes, a slight excess of nitrite which is still present is destroyed by means of sulfamic acid.

Coupling 3.26 g of N,N-diethyl-m-toluidine are dissolved in 25 ml of water by means of 3 ml of 10 N hydrochloric acid, and the suspension of the diazonium salt is added. The pH is adjusted to 3 with 2 N sodium hydroxide solution and the mixture is left to stand at this pH value for 3 hours. The pH is then increased to 9.5 and the product is filtered off. After being washed with a little brine, it is dried in vacuo at 65°–70°. This gives 11.91 g of the monoazo dye of the formula

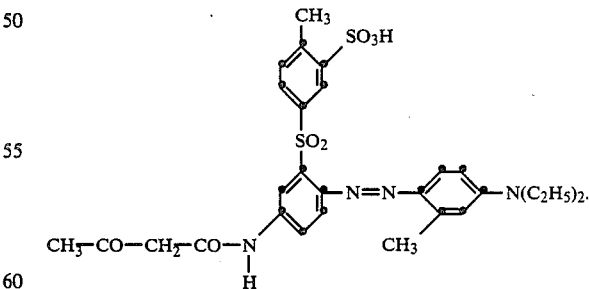

The dye thus obtained dyes polyamide in yellowish-tinged red shades.

EXAMPLE 6

Benzoylation 36.59 g of 2,5-diamino-4'-methyl-1,1'-diphenylsulfone-3'-sulfonic acid are dissolved in 210 ml of water at pH 7.5 and at 45°–50° by means of 10 N sodium hydroxide solution. 11.67 g of sodium bicarbonate are added and the mixture is cooled to 20°. 16.02 g of benzoyl chloride are added dropwise in the course of 1½ hours at 20°–27° and stirring is continued for a further ½ hour.

Diazotisation

The suspension prepared above is made up to a volume of 400 ml with water and is made into a solution at 40°. 26.75 ml of 10 N hydrochloric acid are added and diazotisation is carried out at 40°–44° using 26.75 ml of 4 N sodium nitrite. After stirring for a further period of ¼ hour, any excess of nitrite which may still be present is destroyed with sulfamic acid.

Coupling 16.3 g of N,N-diethyl-m-toluidine are added dropwise at 45°–41° to the suspension of the diazonium salt in the course of 20 minutes. The pH is raised gradually from 3 to a value of 11 with 10 N sodium hydroxide solution and the mixture is warmed to 50°–55° towards the end of the coupling. After adjusting the pH subsequently to 1.5 with 10 N hydrochloric acid, the temperature is raised to 65° and the mixture is filtered. After being washed with water, the product is dried at 100°–110°. This gives 59.5 g of the monoazo dye of the formula

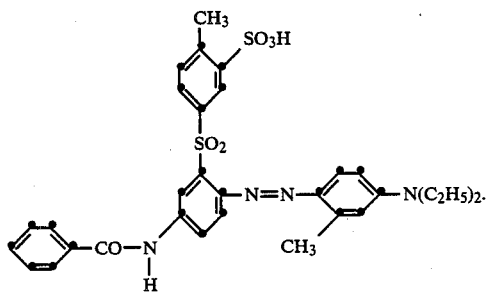

The dye thus obtained dyes polyamide in yellowish-tinged red shades.

EXAMPLE 7:

Diazotisation 8.0 g of the compound from Example 1 are dissolved at pH 8 in 50 ml of water at 20°–25°. 25 g of ice and 5 ml of 4N sodium nitrite are added and the mixture is then treated with 11 ml of an approximately 31% solution of naphthalene-1-sulfonic acid. After 20 minutes, a slight excess of nitrite is destroyed with sulfamic acid.

Coupling 3.26 g of N,N-diethyl-m-toluidine are dissolved in 25 ml of water by means of 3 ml of 10N hydrochloric acid, and the solution is added to the suspension of the diazonium salt. The pH is gradually adjusted to 8.5 with 2N sodium hydroxide solution and the coupling is completed. The precipitate is filtered off, washed with a little water and dried in vacuo at 60°–70°. This gives 11.1 g of the monoazo dye of the formula

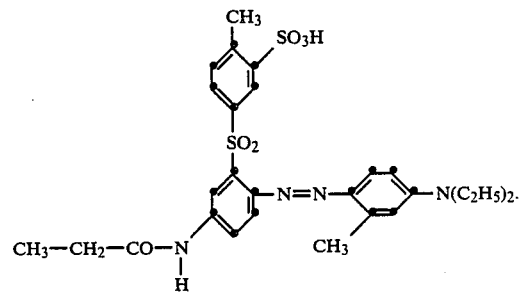

The dye thus obtained dyes polyamide in yellowish-tinged red shades from a weakly acid bath. The dye has an outstanding build-up capacity, an excellent stability to formaldehyde and good fastness to wet processing and light.

EXAMPLE 8

34.2 g of 2,5-diamino-4′-methyl-1,1′-diphenylsulfone-3′-sulfonic acid and 8.4 g of sodium bicarbonate are stirred to form a homogeneous mixture in 75 ml of diethylene glycol dimethyl ether. After adding 13.9 g of salicylic acid and 68.2 g of triphenyl sulfite, the mixture is warmed and is stirred for a further 6 hours at 115°–125°. 300 ml of chloroform are added at room temperature and the product is filtered off and washed with the same quantity of solvent. The residue on the filter is stirred into 200 ml of water, the pH being adjusted to 7 with 10N sodium hydroxide solution, and is filtered off with suction again. After being washed with ice water, the product is dried in vacuo at 60°–70°. This gives 22.1 g of the intermediate of the formula

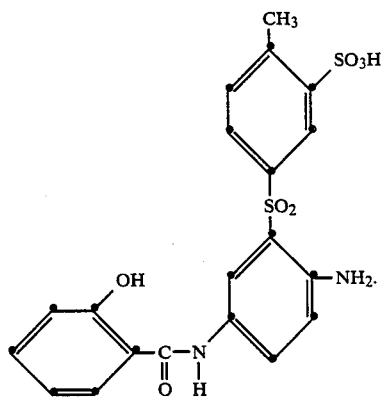

The procedure indicated in Examples 1–8 is repeated, using the monoacyl derivative of 2,5-diamino-4′-methyl-1,1′-diphenylsulfone-3′-sulfonic acid as the diazo component and the compounds listed in the following table as the coupling component. Water-soluble dyes which dye polyamide in the shade indicated, with similarly good properties, are obtained similarly.

General diazo component
2-amino-5-acylamino-4'-methyl-1,1'-diphenylsulfone-3'-sulfonic acid
| No. | Acyl radical | Coupling component | Shade on polyamide |
|---|---|---|---|
| 1 | —COCH$_3$ | 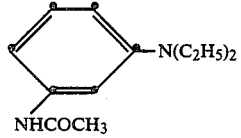 | yellowish-tinged red |
| 2 | " | 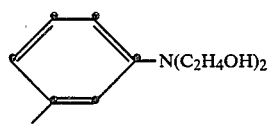 | yellowish-tinged red |
| 3 | " | 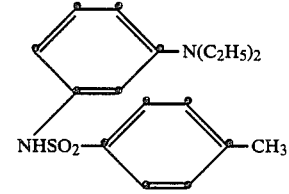 | yellowish-tinged red |
| 4 | " | 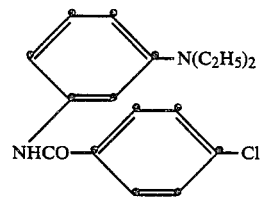 | red |
| 5 | " | 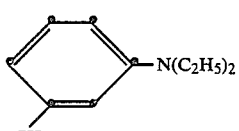 | yellowish-tinged red |
| 6 | " | 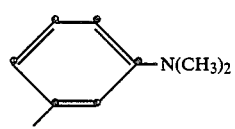 | yellowish-tinged red |
| 7 | " | 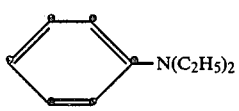 | reddish-tinged orange |
| 8 | " | 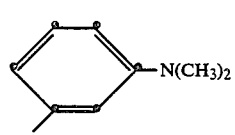 | reddish-tinged orange |
| 9 | " | 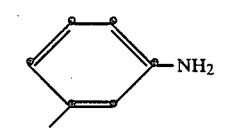 | reddish-tinged orange |

-continued

| No. | Acyl radical | Coupling component | Shade on polyamide |
|---|---|---|---|
| 10 | —COCH₃ | 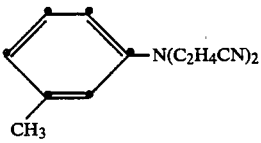 4-methyl-N,N-bis(2-cyanoethyl)aniline | orange |
| 11 | " | 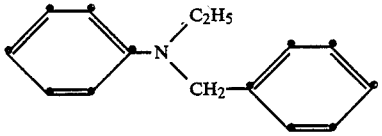 N-ethyl-N-benzylaniline | reddish-tinged orange |
| 12 | " | 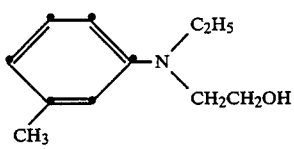 N-ethyl-N-(2-hydroxyethyl)-4-methylaniline | yellowish-tinged red |
| 13 | " | 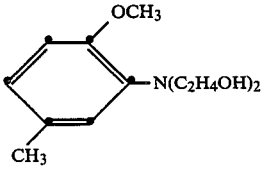 2-methoxy-5-methyl-N,N-bis(2-hydroxyethyl)aniline | red |
| 14 | " | 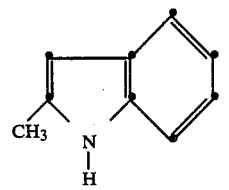 2-methylindole | reddish-tinged yellow |
| 15 | " | 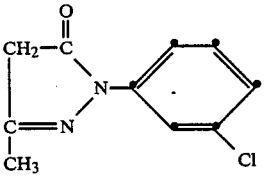 1-(4-chlorophenyl)-3-methyl-5-pyrazolone | reddish-tinged yellow |
| 16 | " | 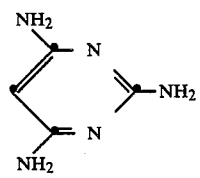 2,4,6-triaminopyrimidine | reddish-tinged yellow |
| 17 | —COCH₂CH₃ | " | reddish-tinged yellow |
| 18 | " | 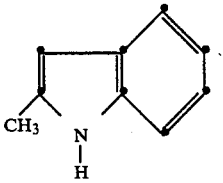 2-methylindole | reddish-tinged yellow |
| 19 | —COCH₂CH₃ | 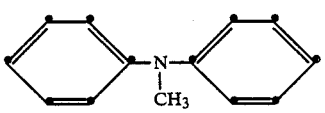 N-methyldiphenylamine | reddish-tinged orange |

| No. | Acyl radical | Coupling component | Shade on polyamide |
|---|---|---|---|
| 20 | —COCH$_2$CH$_3$ | 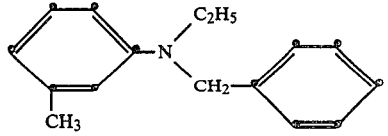 | reddish-tinged orange |
| 21 | " | 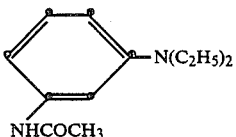 | yellowish-tinged red |
| 22 | —COCH$_2$CH$_2$Cl | 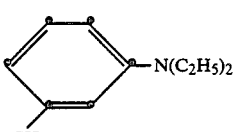 | yellowish-tinged red |
| 23 | " | 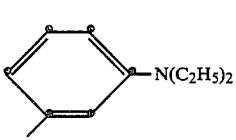 | yellowish-tinged red |
| 24 | " | 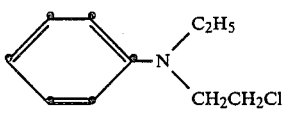 | reddish-tinged orange |
| 25 | " | 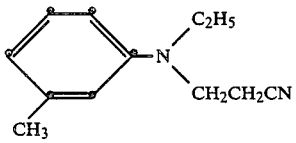 | reddish-tinged orange |
| 26 | —COCH$_2$CH$_2$Cl | 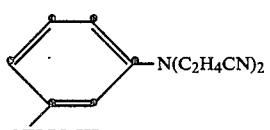 | orange |
| 27 | " | 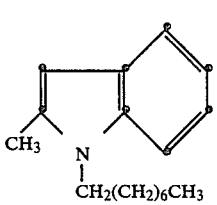 | reddish-tinged yellow |
| 28 | —COCH$_2$COCH$_3$ | 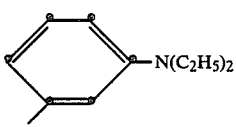 | yellowish-tinged red |
| 29 | " | 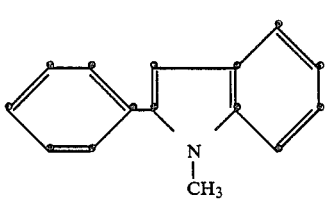 | reddish-tinged yellow |

-continued
| No. | Acyl radical | Coupling component | Shade on polyamide |
|---|---|---|---|
| 30 | —COCH₂CH₂CH₃ | 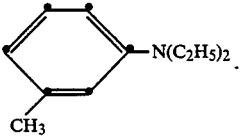 | yellowish-tinged red |
| 31 | " | 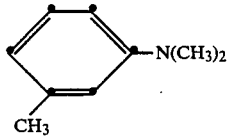 | yellowish-tinged red |
| 32 | " | 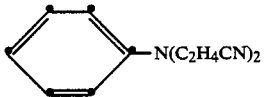 | reddish-tinged yellow |
| 33 | —COCH₂CH₂CH₃ | 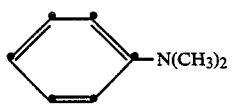 | reddish-tinged orange |
| 34 | " | 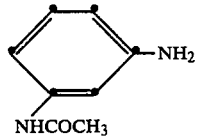 | reddish-tinged orange |
| 35 | —COCH(CH₃)₂ | 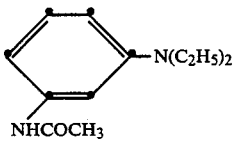 | yellowish-tinged red |
| 36 | " | 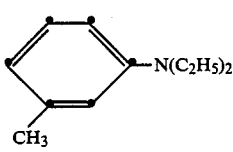 | yellowish-tinged red |
| 37 | " | 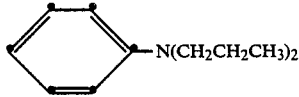 | reddish-tinged orange |
| 38 | —COCH(CH₃)₂ | 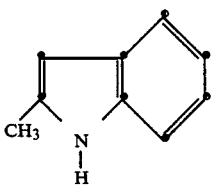 | reddish-tinged yellow |
| 39 | " | 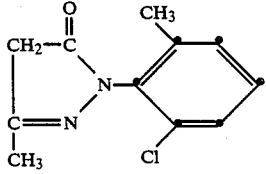 | reddish-tinged yellow |

-continued

| No. | Acyl radical | Coupling component | Shade on polyamide |
|---|---|---|---|
| 40 | —COCH$_2$CH$_2$CH$_2$CH$_3$ | 4-N(C$_2$H$_5$)$_2$, 3-CH$_3$ phenyl | yellowish-tinged red |
| 41 | —COCH$_2$CH$_2$CH$_2$CH$_3$ | 4-N(CH$_3$)$_2$, 3-CH$_3$ phenyl | yellowish-tinged red |
| 42 | " | 4-N(C$_2$H$_5$)$_2$, 2-NHCOCH$_3$ phenyl | yellowish-tinged red |
| 43 | " | 4-OCH$_3$* phenyl | yellowish-tinged orange |
| 44 | " | 4-OC$_2$H$_5$*, 3-CH$_3$ phenyl | yellowish-tinged orange |
| 45 | —COCH$_2$CH(CH$_3$)$_2$ | 4-N(C$_2$H$_5$)(CH$_2$CH$_2$OH) phenyl | reddish-tinged orange |
| 46 | " | 4-N(C$_2$H$_5$)(CH$_2$CH$_2$OH), 3-CH$_3$ phenyl | yellowish-tinged red |
| 47 | " | 4-N(C$_2$H$_5$)(CH$_2$-C$_6$H$_5$), 3-CH$_3$ phenyl | reddish-tinged orange |
| 48 | " | 4-N(C$_2$H$_5$)$_2$, 3-CH$_3$ phenyl | yellowish-tinged red |
| 49 | —COCH$_2$CH(CH$_3$)$_2$ | 4-N(C$_2$H$_5$)$_2$, 2-NHCOCH$_3$ phenyl | yellowish-tinged red |
| 50 | —COC(CH$_3$)$_3$ | " | yellowish-tinged red |

-continued

| No. | Acyl radical | Coupling component | Shade on polyamide |
|---|---|---|---|
| 51 | " | 4-N(C₂H₅)₂, 3-CH₃ phenyl | yellowish-tinged red |
| 52 | " | phenyl-NHCH₂CH₂CN | reddish-tinged orange |
| 53 | —COC(CH₃)₃ | 4-N(C₂H₅)₂, 3-OCH₃ phenyl | reddish-tinged orange |
| 54 | " | 4-N(C₂H₅)₂, 3-NHCO-phenyl | red |
| 55 | " | 2-methylindole | reddish-tinged yellow |
| 56 | —COCH(C₂H₅)CH₂CH₃ | 4-N(C₂H₅)₂, 3-CH₃ phenyl | yellowish-tinged red |
| 57 | " | 4-N(C₂H₅)₂, 3-NHCOCH₃ phenyl | yellowish-tinged red |
| 58 | " | 4-N(C₂H₅)(CH₂CH₂OH), 3-CH₃ phenyl | yellowish-tinged red |
| 59 | —COCH(C₂H₅)CH₂CH₃ | 2-methylindole | reddish-tinged yellow |

-continued

| No. | Acyl radical | Coupling component | Shade on polyamide |
|---|---|---|---|
| 60 | —COCH(C₂H₅)CH₂CH₂CH₃ | 4-N(C₂H₅)₂, 3-CH₃ phenyl | yellowish-tinged red |
| 61 | " | 4-N(C₂H₅)₂, 2-NHCOCH₃ phenyl | yellowish-tinged red |
| 62 | —CO—C₆H₅ | " | yellowish-tinged red |
| 63 | " | 4-N(C₄H₉)₂ phenyl | reddish-tinged orange |
| 64 | —CO—C₆H₅ | 4-N(C₂H₅)(CH₂CH₂SO₃H), 3-CH₃ phenyl | yellowish-tinged red |
| 65 | —CO—C₆H₅ | pyrazole coupled to 2-Cl-5-SO₃H-phenyl (CH₂—C(=NH), C(CH₃)=N, N—N) | yellow |
| 66 | " | 2-methylindole | reddish-tinged yellow |
| 67 | —CO—C₆H₄—CH₃ | 4-N(C₂H₅)₂, 3-CH₃ phenyl | yellowish-tinged red |
| 68 | —CO—C₆H₄—Cl | " | yellowish-tinged red |
| 69 | " | 4-N(C₂H₅)₂, 2-NHCOCH₃ phenyl | yellowish-tinged red |

-continued

| No. | Acyl radical | Coupling component | Shade on polyamide |
|---|---|---|---|
| 70 | 2-OH-benzoyl (—CO—C₆H₄—OH) | " | yellowish-tinged red |
| 71 | " | 4-N(C₂H₅)₂, 3-CH₃ phenyl | yellowish-tinged red |
| 72 | 2-COOH-benzoyl (—CO—C₆H₄—COOH) | 4-N(C₂H₅)₂, 3-CH₃ phenyl | yellowish-tinged red |
| 73 | " | 4-N(C₂H₅)₂, 3-NHCOCH₃ phenyl | yellowish-tinged red |
| 74 | " | 3-CH₃-phenyl-N(C₂H₅)(CH₂-C₆H₅) | reddish-tinged orange |
| 75 | " | phenyl-N(CH₃)(CH₂-C₆H₅) | reddish-tinged orange |
| 76 | —COCH₂—C₆H₅ | 4-N(C₂H₅)₂, 3-CH₃ phenyl | yellowish-tinged red |
| 77 | " | 4-N(C₂H₅)₂, 3-NHCOCH₃ phenyl | yellowish-tinged red |
| 78 | —CONHCH₃ | 4-N(C₂H₅)₂, 3-CH₃ phenyl | yellowish-tinged red |
| 79 | —CONHCH₃ | 4-N(C₂H₅)₂, 3-NHCOCH₃ phenyl | yellowish-tinged red |

-continued

| No. | Acyl radical | Coupling component | Shade on polyamide |
|---|---|---|---|
| 80 | $-CONHC_2H_5$ | phenyl with $-N(C_2H_4CN)_2$ and $NHCOCH_3$ | orange |
| 81 | " | phenyl with $-N(C_4H_9)_2$ | reddish-tinged orange |
| 82 | $-CONHCH(CH_3)_2$ | phenyl with $-N(C_2H_5)_2$ and $CH_3$ | yellowish-tinged red |
| 83 | " | phenyl with $CH_3$, $-N(C_2H_5)(CH_2\text{-phenyl})$ | reddish-tinged orange |
| 84 | $-CONHC(CH_3)_3$ | phenyl with $-N(C_2H_5)_2$ and $CH_3$ | yellowish-tinged red |
| 85 | $-CONH-$ cyclohexyl (H) | " | yellowish-tinged red |
| 86 | $-CONH-$phenyl | " | yellowish-tinged red |
| 87 | $-CONH-$phenyl | phenyl with $-N(C_2H_5)_2$ and $NHCOCH_3$ | yellowish-tinged red |
| 88 | $-CONH-$phenyl-Cl | " | yellowish-tinged red |
| 89 | " | phenyl with $-N(C_2H_5)_2$ and $CH_3$ | yellowish-tinged red |
| 90 | $-CONH-$phenyl-$CH_3$ | " | yellowish-tinged red |
| 91 | $-CON(CH_3)_2$ | " | yellowish-tinged |

-continued

| No. | Acyl radical | Coupling component | Shade on polyamide |
|---|---|---|---|
| 92 | $-CON(C_2H_5)_2$ | " | red / yellowish-tinged red |
| 93 | $-\overset{O}{\underset{\|}{C}}-OCH_3$ | ![benzene ring with $-N(C_2H_5)_2$ and $CH_3$] | yellowish-tinged red |
| 94 | $-\overset{O}{\underset{\|}{C}}-OC_2H_5$ | " | yellowish-tinged red |
| 95 | $-\overset{O}{\underset{\|}{C}}-OCH_2CH_2OH$ | " | yellowish-tinged red |
| 96 | $-\overset{O}{\underset{\|}{C}}-OCH_2CH_2CH_3$ | ![benzene ring with $-N(C_2H_5)_2$ and $CH_3$] | yellowish-tinged red |
| 97 | $-\overset{O}{\underset{\|}{C}}-OCH(CH_3)_2$ | " | yellowish-tinged red |
| 98 | $-\overset{O}{\underset{\|}{C}}-OCH_2CH(CH_3)_2$ | " | yellowish-tinged red |
| 99 | $-\overset{O}{\underset{\|}{C}}-O-CH_2CH_2OCH_3$ | " | yellowish-tinged red |
| 100 | $-\overset{O}{\underset{\|}{C}}-O-$ phenyl | " | yellowish-tinged red |
| 101 | $-\overset{O}{\underset{\|}{C}}-O-CH_2-$ phenyl | " | yellowish-tinged red |
| 102 | $-SO_2NHC_2H_5$ | " | yellowish-tinged red |
| 103 | $-SO_2-$ phenyl | " | yellowish-tinged red |
| 104 | $-SO_2-$ phenyl $-CH_3$ | " | yellowish-tinged red |
| 105 | " | ![benzene ring with $-N(C_2H_5)_2$ and $NHCOCH_3$] | yellowish-tinged red |

-continued

| No. | Acyl radical | Coupling component | Shade on polyamide |
|---|---|---|---|
| 106 | −SO$_2$−C$_6$H$_3$(CH$_3$)− | 2,5-dimethoxy-4-methyl with −N(C$_2$H$_4$OH)$_2$ (OCH$_3$, CH$_3$ substituents) | red |
| 107 | " | pyrimidine with NH$_2$, NH$_2$, NH$_2$ | reddish-tinged yellow |
| 108 | " | CH$_2$−C(=NH)−N(−N=C(CH$_3$)−)− attached to chlorophenyl-SO$_3$H | yellow |
| 109 | −SO$_2$−C$_6$H$_3$−NHCOCH$_3$ | −N(C$_2$H$_5$)$_2$ on methyl-substituted phenyl (CH$_3$) | yellowish-tinged red |
| 110 | −CO−C$_6$H$_5$ | CH$_2$−C(=NH)−N(−N=C(CH$_3$)−)− attached to phenyl | yellow |
| 111 | −COCH$_2$CH$_2$Cl | " | " |
| 112 | −COC(CH$_3$)$_3$ | " | " |

Dyeing instructions 10 parts of Helanca knitted fabric are dyed in 500 parts of an aqueous liquor which contains 1 g/l of monosodium phosphate and which is adjusted to pH 6 with disodium phosphate. The proportion of the dyestuff according to Example 7 is 0.9%, based on the weight of fibre. The dyeing time at a temperature of 98° is 30–90 minutes. The dyed piece of Helanca material is then taken out and washed and dried in a customary manner.

This gives a piece of Helanca material which has been dyed deep yellowish-tinged red and which has a clear shade and good overall fastness properties and, in particular, has good stability to formaldehyde.

*In these cases (Examples 43 and 44) coupling was not carried out with the coupling components indicated in the table, but with the corresponding non-etherified hydroxybenzenes, ie. with phenol and m-cresol, respectively, and the hydroxyl groups were alkylated after coupling. The fact that the hydroxybenzenes which have already been etherified are mentioned as the coupling components in Examples 54 and 55, merely serves the purpose of clarifying the structure of the end products.

What is claimed is:
1. A monoazo dye of the formula

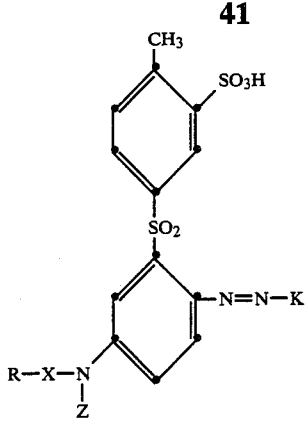

in which K is the radical of an aminobenzene, alkoxybenzene, hydroxybenzene, pyrazolone, aminopyrazole, pyrimidine, indole or acetoacetamide coupling component; R is C$_{1-12}$-alkyl which is unsubstituted or substituted by a member selected from the group consisting of hydroxyl, sulfato, halogen, sulfo, carboxyl, cyano, C$_{1-4}$-alkoxy, C$_{1-6}$-alkanoyl and benzoyl, or is cycloalkyl, aralkyl or aryl which is unsubstituted or substituted by a member selected from the group consisting of C$_{1-4}$-alkyl, C$_{1-4}$-alkoxy, halogen, C$_{1-6}$-alkanoylamino, hydroxyl and carboxyl; X is a —CO— or —SO$_2$— group, a

group, R being attached to the oxygen atom, or an —SO$_2$NH— or

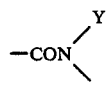

group, R being attached to the nitrogen atom and Y being hydrogen or C$_{1-4}$-alkyl; and Z is hydrogen or C$_{1-4}$-alkyl; provided that K is not a diphenylamine coupling component.

2. A monoazo dye according to claim 1, in which K is an aminobenzene, N—C$_{1-4}$ alkylaminobenzene or N,N-di-C$_{1-4}$ alkylaminobenzene radical which is unsubstituted or substituted in the benzene ring by methyl, methoxy, chlorine, acetylamino, ureido, benzoylamino, chlorobenzoylamino and methylphenylsulfonylamino, and in which the N-alkyl radicals independently of one another are unsubstituted or substituted by hydroxyl, chlorine, cyano, sulfo or phenyl, or K is a C$_{1-2}$ alkoxybenzene radical which is unsubstituted or substituted by methyl, a 2-methylindole, 2-phenylindole, N-octyl-2-methylindole or N-methyl-2-phenylindole radical, a 1-phenyl-3-methylpyrazolone radical which is unsubstituted or substituted in the phenyl radical by chlorine and methyl, or a 1-phenyl-3-methylaminopyrazole radical which is unsubstituted or substituted in the phenyl radical by chlorine or sulfo, or is a 2,4,6-triaminopyrimidine radical and in which R is C$_{1-7}$ alkyl which is unsubstituted or substituted by chlorine, hydroxyl, methoxy or acetyl, or is a cyclohexyl, benzyl or phenyl which is unsubstituted or substituted by methyl, hydroxyl, chlorine, carboxyl or acetylamino, X is —CO— or —SO$_2$—,

R being attached to the oxygen atom, or —SO$_2$NH— or

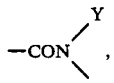

R being attached to the nitrogen atom and Y being hydrogen, methyl or ethyl, and Z is hydrogen.

3. A monoazo dye according to claim 2, in which K is 4-N,N-diethylamino-2-methyl-1-phenyl, R is ethyl, β-chloroethyl, tert.-butyl, phenyl or 4-methylphenyl and X is the —CO— or —SO$_2$— group and Z is hydrogen.

4. The monoazo dye according to claim 3 of the formula

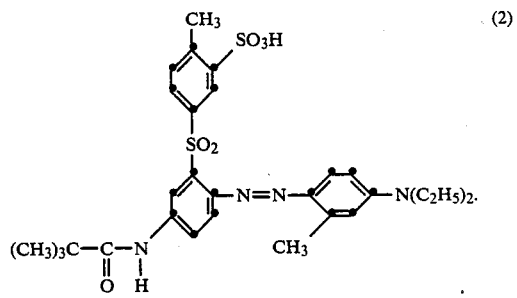

(2)

5. The monoazo dye according to claim 3 of the formula

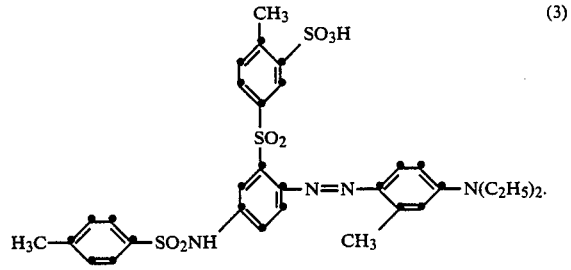

(3)

6. The monoazo dye according to claim 3 of the formula

7. The monoazo dye according to claim 3 of the formula
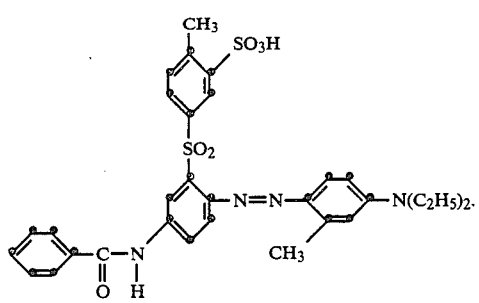
(4)
8. The monoazo dye according to claim 2 of the formula
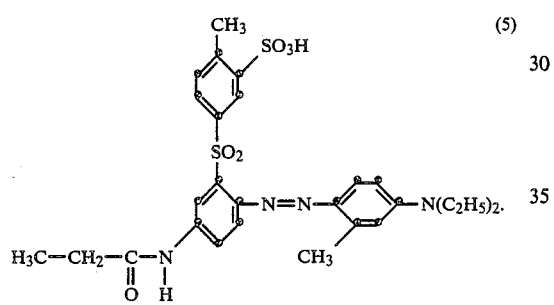
(5)
9. The monoazo dye according to claim 3 of the formula
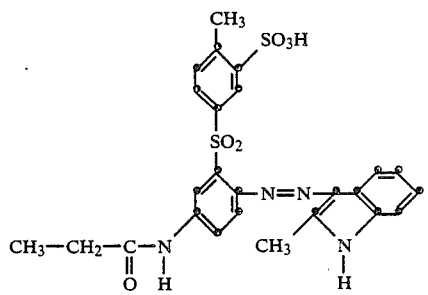
(6)
9. The monoazo dye according to claim 3 of the formula
(7)
10. The monoazo dye according to claim 2 of the formula
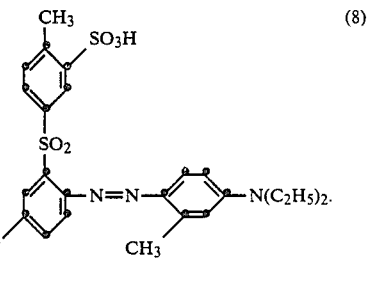
(8)
* * * * *